United States Patent [19]

Yamaji et al.

[11] Patent Number: 4,677,464
[45] Date of Patent: Jun. 30, 1987

[54] VIDEO SIGNAL GENERATING APPARATUS WITH COLOR SEQUENCING

[75] Inventors: Kazunori Yamaji; Takashi Nakamura; Taku Kihara, all of Kanagawa, Japan

[73] Assignee: Sony Corporation, Tokyo, Japan

[21] Appl. No.: 618,839

[22] Filed: Jun. 8, 1984

[30] Foreign Application Priority Data

Jun. 13, 1983 [JP] Japan ................................ 58-105385

[51] Int. Cl.⁴ ...................... H04N 9/04; H04N 11/06; H04N 5/78; H04N 9/79
[52] U.S. Cl. ........................................ 358/41; 358/12; 358/141; 358/312; 360/9.1
[58] Field of Search ...................... 358/41, 137, 11, 12, 358/140, 141, 312; 360/9.1

[56] References Cited

U.S. PATENT DOCUMENTS

| | | | |
|---|---|---|---|
| 4,057,836 | 11/1977 | Munsey | 358/140 |
| 4,280,151 | 7/1981 | Tsunekawa et al. | 360/9.1 |
| 4,458,271 | 7/1984 | Horstmann | 358/12 |
| 4,614,980 | 9/1986 | Ninomiya et al. | 360/9.1 |

FOREIGN PATENT DOCUMENTS 120696 10/1984 European Pat. Off. ............. 360/9.1
1557608 12/1979 United Kingdom .

Primary Examiner—James J. Groody
Assistant Examiner—Robert M. Bauer
Attorney, Agent, or Firm—Lewis H. Eslinger; Alvin Sinderbrand

[57] ABSTRACT

A video signal generating apparatus having a video camera which has a higher scanning speed than that of a standard video camera for generating a prior standard television video signal is disclosed which includes a circuit for dividing the video signal into a plurality of channel video signals, a circuit for expanding a time axis of the channel video signals, a circuit for combining the time axis expanded channel video signals for producing a plurality of composite video signals so that each of the composite video signals has a band width similar to that of the standard television video signal respectively and, a circuit for supplying a reference signal to the combining circuit so that each of the composite video signals has a color framing sequence same as that of the standard television video signal respectively.

4 Claims, 20 Drawing Figures

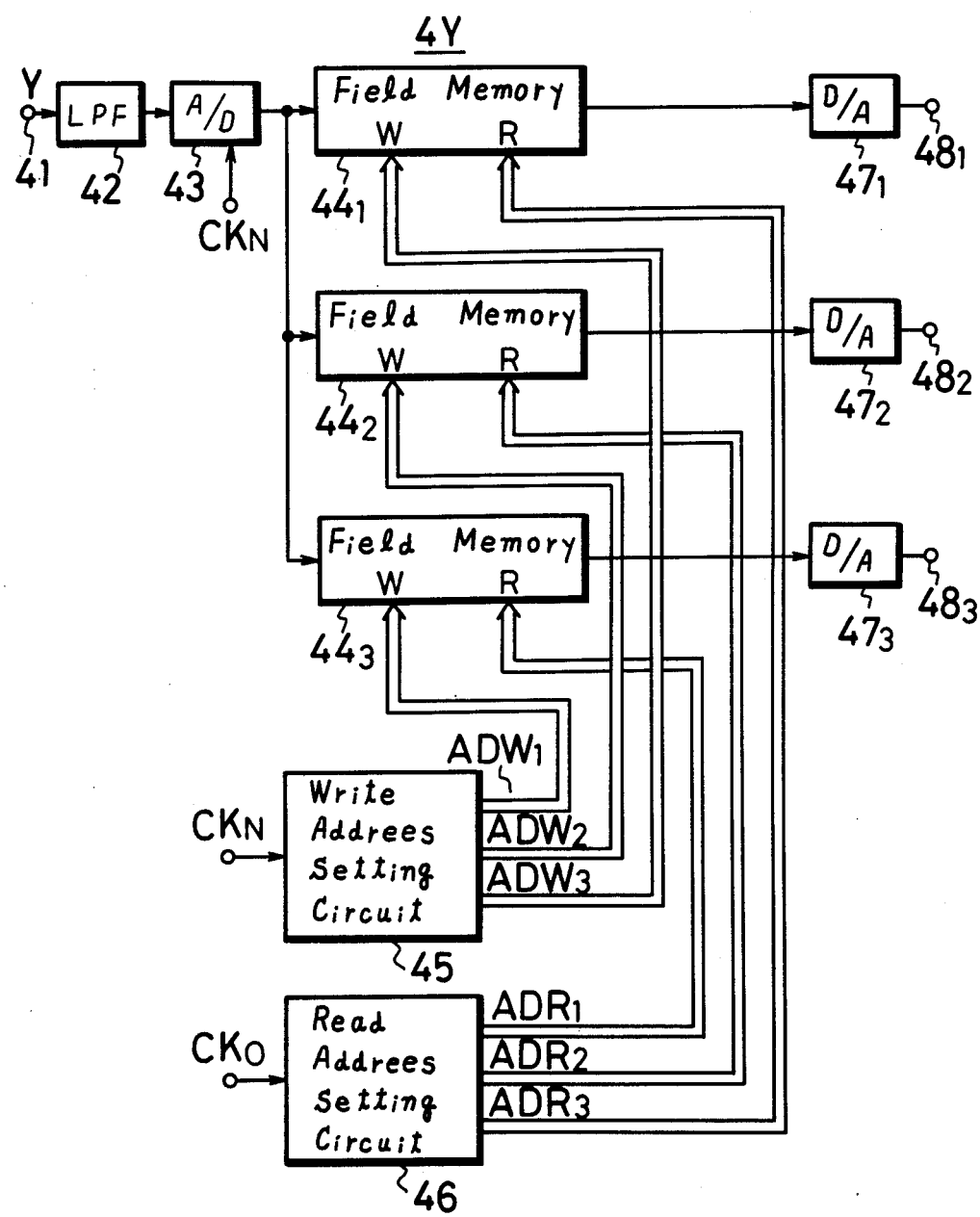

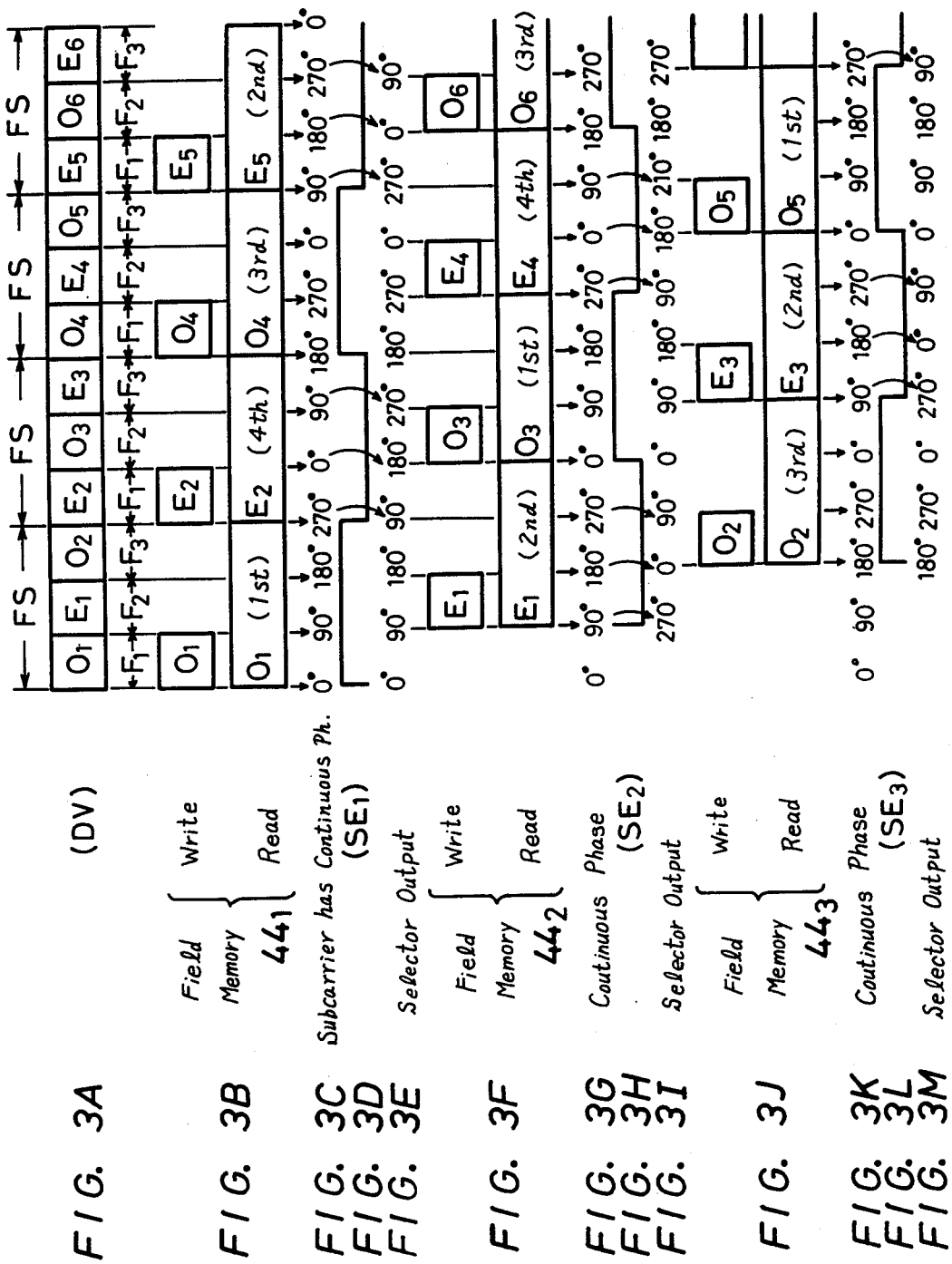

FIG. 4

| | FS → | | | |
|---|---|---|---|---|
| 1st Chan. | 1st Fld. | O | O | O |
| 2nd Chan. | 2nd Fld. | E | E | E |
| 3rd Chan. | 3rd Fld. | O | O | O |
| 4th Chan. | 4th Fld. | E | E | E |

FIG. 5

| | FS → | | | |
|---|---|---|---|---|
| 1st Chan. | 1st Fld. | O | 4th Fld. | E | 3rd Fld. | O | 2nd Fld. | E |
| 2nd Chan. | 2nd Fld. | E | 1st Fld. | O | 4th Fld. | E | 3rd Fld. | O |
| 3rd Chan. | 3rd Fld. | O | 2nd Fld. | E | 1st Fld. | O | 4th Fld. | E |

FIG. 8

| | FS → | | | | |
|---|---|---|---|---|---|
| 1st Chan. | 1st Fld. | O | 2nd Fld. | E | 3rd Fld. | O | 4th Fld. | E |
| 2nd Chan. | 2nd Fld. | E | 3rd Fld. | O | 4th Fld. | E | 1st Fld. | O |
| 3rd Chan. | 3rd Fld. | O | 4th Fld. | E | 1st Fld. | O | 2nd Fld. | E |
| 4th Chan. | 4th Fld. | E | 1st Fld. | O | 2nd Fld. | E | 3rd Fld. | O |
| 5th Chan. | 1st Fld. | O | 2nd Fld. | E | 3rd Fld. | O | 4th Fld. | E |

VIDEO SIGNAL GENERATING APPARATUS WITH COLOR SEQUENCING

BACKGROUND OF THE INVENTION

1. Field of the Invention

The present invention relates generally to video signal generating apparatus and more particularly is directed to a video signal generating apparatus capable of generating a video signal which is suitable for being recorded on a video tape recorder (VTR) used in a high speed video system in which a moving object at high speed is picked up by a television camera and the picked up output is recorded on the VTR.

2. Description of the Prior Art

A high speed film camera has hitherto been proposed to pick up and to record an object moving at high speed. This high speed film camera, however, has a defect that the object moving at high speed, which is picked up and recorded by such camera, can not be reproduced immediately. To remove the above defect, various researches and developments have been made in which the object moving at high speed is picked up by a television camera, recorded by a VTR or the like and then reproduced immediately.

As is known well, it takes 1/60 second at minimum for an ordinary television camera to convert one sheet of picture (one field) to an electrical signal. Therefore, it is impossible for the television camera to pick up an object which moves at speed faster than 1/60 second.

To solve this problem, a technique is disclosed in, for example, the publication document of the Japanese patent application examined NO. 26416/1977 in which the visual field of an image pickup tube is divided into a plurality of sections, the whole of an object is placed in each one section of the divided sections and the object image on the image pickup tube is scanned during the scanning period of time corresponding to each section to thereby enable the object moving at high speed to be picked up.

Further, in the publicated document of the Japanese patent application examined, NO. 13631/1980, there is disclosed a technique in which the optical image of an object is sequentially projected onto a plurality of image pickup tubes having accumulation effect at every constant interval during a constant time period, and the picked-up or video signals from the respective image pickup tubes are respectively supplied to a plurality of recording apparatus to thereby successively record the time image of the object moving at high speed.

However, according to the technique disclosed in the publicated document of the Japanese patent application examined, NO. 26416/1977, since the visual field is substantially narrowed, only the image of the periphery of the moving object is obtained. Also since the movable range of the moving object is confined within the area of the divided one section, this technique is not suitable for general use. Moreover, according to the technique disclosed in the publicated document of the Japanese patent application examined, NO. 13631/1980, since a plurality of image pick-up elements, each having accumulation effect, and a plurality of recording apparatus are required, the arrangement thereof becomes complicated, which then becomes significantly inconvenient in practical use.

In addition, apart from the above techniques, other technique may be considered that a video signal picked up by a television camera at the scanning speed of N (N is an integer of 2 or above) times higher than the ordinary scanning speed, namely, the scanning speed for obtaining the standard television signal is directly recorded by using a VTR. In this case, however, since the high speed video signal picked up by the television camera having the scanning speed N times the normal scanning speed is recorded with the high speed being remained as it is, the recording band must be increased N times the normal recording band. As a result, the revolution number of the rotary head must be increased N times the normal revolution number, the carrier frequency of the FM modulation (frequency-modulation) for the video signal must be increased N times the normal carrier frequency and the signal processing in the base band must have the characteristic N times the normal characteristic. Further, in order to establish the compatibility by making the inclination angle of the recorded track or the like comply with the normal recorded pattern, the tape transport speed must be increased N times the normal tape transport speed.

As described above, when the video signal recorded at the speed N times the normal speed is reproduced by the VTR having the normal revolution speed of the rotary head and the normal tape transport speed, the object moving at high speed can be visually perceived. In this case, it becomes quite difficult to ensure the characteristic of the recording and reproducing circuit such as the corresponding relation between the emphasis upon recording and the deemphasis upon reproducing and the stability of the frequency of the frequency-modulated signal, etc. Even if the signal processed in the base band N times the normal base band upon recording is processed in 1/N time upon reproducing, it is quite difficult to ensure various characteristics. Moreover, when the carrier frequency of the FM modulation for the recording signal becomes N times the carrier frequency of the normal VTR, the impedance of the rotary head, characteristic of a rotary transformer and the like cause serious problems so that in practice it becomes impossible to construct a system having a large value of N.

Furthermore, if the revolution number of the rotary head is changed between the recording mode and the reproducing mode, a so-called air film layer between the rotary head drum and the tape is changed in thickness. As a result, the tracing condition of the head on the tape is made different and also the contact pressure of the head with the tape is changed so that the reproducing sensitivity may be lowered.

On the other hand, such a system is known well that a high speed video signal can equivalently be obtained by delaying the output from the television camera having the normal standard scanning speed by a predetermined timing each. However, in this case, there are then defects that the number of the video equipments operating at normal speed is increased and that a mechanism having complicated arrangement is required.

OBJECTS AND SUMMARY OF THE INVENTION

Accordingly, it is an object of the present invention to provide an improved video signal generating apparatus.

It is another object of the present invention to provide a video signal generating apparatus capable of processing a signal obtained from a television camera the scanning speed of which is higher than the normal scanning speed in the same way as processing an output signal obtained from a television camera having a normal scanning speed.

It is a further object of the present invention to provide a video signal generating apparatus capable of generating a video signal which is suitable for being recorded on a video tape recorder (VTR) used in a video system in which an object is picked up by a high speed scanning television camera and the output thus picked up is recorded on the VTR.

According to one aspect of the present invention, there is provided a video signal generating apparatus having a video camera which has a higher scanning speed than that of a standard video camera for generating a prior standard television video signal comprising:

(a) means for dividing said video signal into a plurality of channel video signals;

(b) means for expanding a time axis of said channel video signals;

(c) means for combining said time axis expanded channel video signals for producing a plurality of composite video signals so that each of said composite video signals has a band width similar to that of said prior standard television video signal respectively; and (d) means for supplying a reference signal to said combining means so that each of said composite video signals has a color framing sequence same as that of said standard television video signal respectively.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is a block diagram showing a main part of the video signal generating apparatus of the present invention shown in FIG. 1;

FIGS. 3A to 3M are respectively timing charts useful for the explanation thereof;

FIGS. 4 and 5 are respectively diagrams useful for explaining the output modes of a plurality of channels in the embodiment of the present invention;

FIG. 8 is a diagram useful for explaining the output modes of a plurality of channels in another embodiment of the video signal generating asparatus according to the present invention.

DESCRIPTION OF THE PREFERRED EMBODIMENTS

Now, the present invention will hereinafter be described with reference to the drawings.

Figure 1:
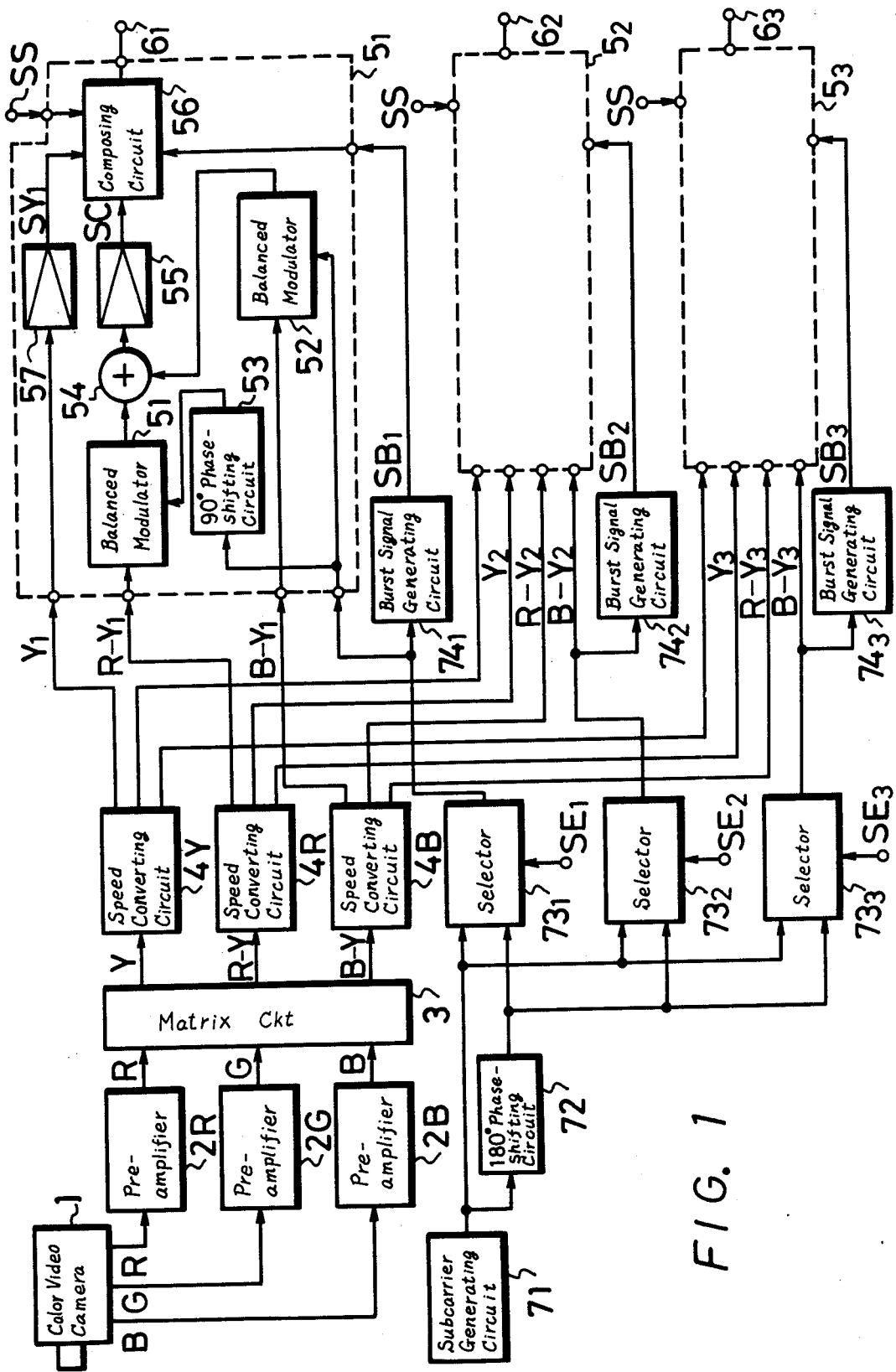
FIG. 1 is a systematic block diagram showing an embodiment of a video signal generating apparatus according to the present invention.

FIG. 1 is a systematic block diagram showing a principle of an embodiment of the circuit arrangement of the video signal generating apparatus according to the present invention. In the figure, reference numeral 1 designates a color video camera having, for example, three image pick-up tubes and which is operated at scanning speed N times the ordinary scanning speed. In this embodiment, the color video camera 1 is operated at scanning speed, for example, three times the ordinary scanning speed so that each of red, green and blue primary color signals from the color video camera 1 has a frequency band three times that of the color signals from the color video camera with the ordinary scanning speed. Since the band of the output from the ordinary color video camera is about 6 MHz, the band of the output signal from the color video camera 1 is 18 MHz or above. Moreover, as the output signal from this color video camera 1, since the scanning speed thereof is three times the scanning speed of the ordinary color video camera, during one field period of a standard television signal or during the period of 1/60 sec in the case of NTSC system color video signal, there is produced a video signal of 3 fields.

The three primary color signals R, G and B from the color video camera 1 are respectively supplied through pre-amplifiers 2R, 2G and 2B to a matrix circuit 3 which produces a luminance signal Y and red and blue color difference signals R-Y and B-Y which then are respectively supplied to speed converting circuits 4Y, 4R and 4B. The speed converting circuits 4Y, 4R and 4B are each adapted to convert a high speed signal of speed three times the ordinary speed into the signal of the ordinary speed. Since the speed converting circuits 4Y, 4R and 4B are constructed exactly the same as one other, the speed converting circuit 4Y will be taken as a typical example and described and the others will not be described.

FIG. 2 is a systematic block diagram showing an example of the speed converting circuit 4Y. The luminance signal Y applied to an input terminal 41 is supplied through a low-pass filter 42 to an A/D (analog-to-digital) converting circuit 43. The low-pass filter 42 serves to restrict the signal band and is made to have the filtering characteristic for passing therethrough signals of 20 MHz or below in this embodiment. While, in the A/D converting circuit 43, the luminance signal Y is sampled at a speed three times that of a case in which the output luminance signal from the color video camera having the ordinary scanning speed is sampled. The sampling rate of the normal video signal is, for example, 14.3 MHz (4 fsc) or about 13.5 MHz in consideration of a color subcarrier frequency fsc because the frequency band of the normal video signal is about 6 MHz. In the A/D converting circuit 43 in this embodiment, the sampling rate thereof is three times thereof and is therefore selected to be about 42.9 MHz or 40.5 MHz.

In this embodiment, the sampling rate is selected to be 40.5 MHz and hence a clock signal $CK_N$ of 40.5 MHz is supplied to the A/D converting circuit 43 by which the luminance signal Y is converted to a digital signal of, for example, 8 bits per one sample.

In practice, the speed converting circuit 4Y includes N, namely, 3 field memory circuits each of which has the capacity of one field amount. The high speed video signal is sequentially written in the 3 field memory circuits by one field amount and the high speed video signals thus written are read out as 3 channels in parallel from the 3 field memory circuits at the ⅓ sampling rate to be converted to the video signal of the ordinary speed.

Reference numerals $44_1$, $44_2$ and $44_3$ respectively designate field memories each having the capacity of one field amount to which the high speed digital luminance signal from the A/D converting circuit 43 is supplied. Write address signals $ADW_1$, $ADW_2$ and $ADW_3$ from a write address setting circuit 45 are respectively supplied to the field memories $44_1$, $44_2$ and $44_3$ and also read address signals $ADR_1$, $ADR_2$ and $ADR_3$ from a read address signal setting circuit 46 are respectively supplied to the field memories $44_1$, $44_2$ and $44_3$. The write address signal setting circuit 45 is supplied with the clock signal $CK_N$ of 40.5 MHz which is three times the ordinary speed and hence forms the write address signals $ADW_1$ to $ADW_3$, each of which changes at speed three times the ordinary speed. On the other hand, the read address setting circuit 46 is supplied with a clock signal $CK_O$ of ordinary speed, 13.5 MHz and hence forms the address signals $ADR_1$ to $ADR_3$ changing at the ordinary speed. The memory access operation of the field memories $44_1$, $44_2$ and $44_3$ is such one that the write-in and read-out are carried out in time sharing manner so that the write-in and the read-out can apparently be performed simultaneously. As shown in FIG. 3, the high speed digital luminance signal DV (see FIG. 3A) is sequentially written in the field memories $44_1$, $44_2$ and $44_3$ by every one field amount in response to the write signals from the write address setting circuit 45. Since the high speed digital luminance signal has the speed three times the normal speed, as will be clear from FIGS. 3B, 3F and 3J, the write timing thereof is delayed by $\frac{1}{3}$ period of one field period FS of the television signal with the normal speed. The delay of the write timing is realized by sequentially switching the memories $44_1$, $44_2$ and $44_3$ at every $\frac{1}{3}$ period $F_1$, $F_2$ and $F_3$ in, for example, one field FS. To this end, in the write address setting circuit 45 the same address is repeatedly set in each $\frac{1}{3}$ period of $F_1$, $F_2$ and $F_3$. Therefore, it may be possible that since the address signals $ADW_1$, $ADW_2$ and $ADW_3$ are the same, the common address signal is used for the three field memories $44_1$ to $44_3$ and the write periods of the three field memories $44_1$ to $44_3$ are switched as mentioned before. As shown in FIGS. 3B, 3F and 3J, an odd field signal O1 of the high speed television signal is written in the field memory $44_1$ during the first $\frac{1}{3}$ period F1 in the period FS, while during the next $\frac{1}{3}$ period F2, an even field signal E1 of the high speed video signal is written in the field memory $44_2$. And, during the further $\frac{1}{3}$ period F3 next to the $\frac{1}{3}$ period F2, a video signal O2 of the next odd field of the high speed video signal is written in the field memory $44_3$. This signal processing will hereinafter be repeated in turn.

Then, at the same time when the high speed video signal is written in the field memories, the signal written therein is instantaneously read out in turn from each field memory at speed $\frac{1}{3}$ the speed upon writing. Accordingly, the read address signals $ADR_1$, $ADR_2$ and $ADR_3$ supplied from the read address setting circuit 46 to the field memories $44_1$, $44_2$ and $44_3$ are such ones that the same address data are supplied under being delayed by the period of $\frac{1}{3}$ the period FS. Therefore, as shown in FIGS. 3B, 3F and 3J, the signals read out from the field memories $44_1$, $44_2$ and $44_3$ are respectively delayed by $\frac{1}{3}$ FS period. The digital luminance signals of 3 channels read out in parallel are converted to the original analog luminance signals by D/A (digital-to-analog) converting circuits $47_1$, $47_2$ and $47_3$ and then led out to output terminals $48_1$, $48_2$ and $48_3$, respectively.

As described above, from the speed converting circuits 4Y, 4R and 4B, the high speed luminance signal Y and the red and blue color difference signals R-Y and B-Y are respectively obtained as 3 channels of the luminance signals $Y_1$, $Y_2$ and $Y_3$ with the normal speed and red and blue color difference signals R-$Y_1$, R-$Y_2$, R-$Y_3$ and B-$Y_1$, B-$Y_2$ and B-$Y_3$ as shown in FIG. 1. In this case, the color difference signals from the circuits 4R and 4B are the signals with the frequencies lower than the frequency bands of the luminance signals and the narrow frequency bands of, for example, 1.2 MHz or below as usual.

The luminance signal $Y_1$ and the red and blue color difference signals R-$Y_1$ and B-$Y_1$ of the first channel are supplied to a first channel encoder $5_1$, the luminance signal $Y_2$ and the red and blue color difference signals R-$Y_2$ and B-$Y_2$ of the second channel are supplied to a second channel encoder $5_2$ and the luminance signal $Y_3$ and the red and blue color difference signals R-$Y_3$ and B-$Y_3$ of the third channel are supplied to a third channel encoder $5_3$, respectively. And, from the encoders $5_1$, $5_2$ and $5_3$ of the respective channels, NTSC composite color video signals are respectively obtained at output terminals $6_1$, $6_2$ and $6_3$ thereof as will be described later.

In this case, since the signal of each of the parallel 3 channels is obtained at every field unit as mentioned above, as, for example, shown in FIG. 3A, a video signal of one field at the first field in the high speed video signals of 3 fields read out during the one field period FS is developed at the output terminal $6_1$ as the first channel signal, a video signal of one field at the second field is developed at the output terminal $6_2$ as the second channel signal and a video signal of one field at the third field is developed at the output terminal $6_3$ as the third channel signal, respectively. Since the sampling rate for the signal of each channel is reduced to $\frac{1}{3}$ such signal becomes the video signal with the normal speed. Therefore, the color video signals respectively developed at the output terminals $6_1$, $6_2$ and $6_3$ are substantially equal to the color video signals derived from a television camera with the normal scanning speed. However, in this case, the signal respectively developed at the output terminals $6_1$, $6_2$ and $6_3$ are the signals of every other 3 fields of the high speed video signals, namely, the intermittent signals in view of the order of the fields of the high speed video signals just like a case in which the signal developed at, for example, the output terminal is formed of the first field video signal, the fourth field signal, the seventh field signal, the tenth field signal and so on. The video signal itself, however, is exactly equal to the normal video signal.

As described above, according to the circuit shown in FIG. 1, the television signals picked up and produced by the high scanning speed television camera are converted in speed to the signals with the speed same as that of the standard television signal and arranged in parallel to one another for 3 channels.

Therefore, the parallel signals at every channels can be processed in the same way as in processing the signal having the normal speed.

When the scanning speed of the color video camera 1 is selected to be N times the normal scanning speed, if the value of N is selected to be odd, the signals developed at the output terminals $6_1$, $6_2$ and $6_3$ of respective channels are the signals in which the odd field O, the even field E, the odd field O and the even field E are alternately succeeded. While, if the scanning speed of the color video camera 1 is selected to be even times, for example, four times the ordinary scanning speed, the output signal of the high speed video signal is produced in parallel at every 4 fields. As a result, as shown in FIG. 4, the output signal of each channel obtained during a certain one field period FS becomes such one in which if the first channel, for example, is the odd field O, the second ctannel is the even field E, the third channel is the odd field O and the fourth channel is the even field E. Also the output signal during the succeeding one field FS becomes such one in which the first channel becomes the odd field O, the second channel becomes the even field E, the third channel becomes the odd field O and the fourth channel becomes the even field E, similarly. Thus, the video signal of the first channel always becomes the odd field O, the video signal of the second channel always becomes the ever field E, . . . so that the signal of each channel becomes the signal having the mode different from that of the ordinary television signal in consideration of the interlaced system. On the contrary, when the scanning speed of the color video camera 1 is selected to be odd times, for example, three times the original scanning speed, as shown in FIG. 5, during a certain one field period FS, the video signal of the first channel becomes the odd field O, the video signal of the second channel becomes the even field E and the video signal of the third channel becomes the odd field O, while during the succeeding one field period FS, the video signal of the first channel becomes the even field E, the video signal of the second channel becomes the odd field O and the video signal of the third channel becomes the even field E so that the signal same as the interlaced television signal in which the odd field O, the even field E, the odd field O and the even field E are alternately arranged is obtained at each channel.

By the way, in the color video signal, in order to make the dot interference occurred along the scanning lines by the color subcarrier wave component inconspicuous, the frequency of the color subcarrier wave is selected to have a predetermined relation relative to the horizontal frequency. In the case of the NTSC color video signal, such relation therebetween is selected to satisfy a relation of ½ line offset and the phase of the color subcarrier wave relative to the scanning line of each field is repeated at every 4 field periods. In other words, if the phase at the beginning of the first field of 4 field-unit is taken as 0°, the phase at the beginning of the second field becomes 270°, the phase at the beginning of the third field becomes 180° and the phase at the beginning of the fourth field becomes 90°. Then, at the beginning of the first field of the succeeding 4 field-unit, the phase returns to 0°.

However, the signal of each channel in the parallel 3 channels is not the signal in which the 1st to 4th fields of the high speed video signal are sequentially arranged but as shown in FIGS. 3 and 5 the order of the 1st to 4th fields is arranged as in the order of the 1st, 4th, 3rd and 2nd fields. Consequently, if in the encoders $5_1$, $5_2$ and $5_3$ of the respective channels, the video signal is directly modulated by the color difference signal on the basis of the serial color subcarrier wave, the phases at the beginnings of the 4th and 2nd fields should be 90° and 270° inherently but become 270° and 90° with phase displacement of 180°, respectively, as shown in FIGS. 3C, 3G and 3K. Therefore, the color subcarrier wave to be supplied to each of the encoders $5_1$, $5_2$ and $5_3$ must be inverted in phase in the 4th and 2nd fields. As will be clear from FIGS. 3 and 5, since in the signal of each channel the phase of the color subcarrier belongs to the different fields at the same time point, in principle, there is provided a circuit at each channel which produces a reference color subcarrier and the reference color subcarrier of each channel is inverted in phase in every channel at the time points of the 2nd and 4th fields.

By the way, in the above example, the signals of the parallel 3 channels are produced at the output terminals $6_1$, $6_2$ and $6_3$ so as to be delayed by the period of ⅓ FS (⅓ field). Within one field, if the phase of the color subcarrier at the beginning of one field is taken as 0°, the phase of the color subcarrier becomes 90° at time point passing ⅓ field therefrom and 180° at time point passing another ⅓ field therefrom. Accordingly, the beginning of the signal in one field of the 2nd channel is delayed by 90° from the beginning of the signal in one field of the 1st channel as shown in FIGS. 3F and 3G, while the beginning of the signal in one field of the 3rd channel is delayed by 180° from the beginning of the signal in one field of the 1st channel as shown in FIGS. 3J and 3K. Then, as will be clear from FIGS. 3B, 3C, 3F, 3G, 3J and 3K, the 1st to 4th field signals of the signal in each channel have exactly the same phase relation relative to the common color subcarriers, accordingly, of the same phase. Therefore, without preparing the reference color subcarrier for every channel, only the reference color subcarrier common to the 3 channels is prepared and then is inverted in phase in every channel at time points of the 2nd and 4th fields.

The circuit arrangement which can realize the above techniques is shown in FIG. 1. In FIG. 1, reference numeral 71 designates a reference color subcarrier generating circuit which produces a color subcarrier of 3.58 MHz. This color subcarrier and the signal which results from phase-inverting the color subcarrier of 3.58 MHz by a 180° phase-shifting circuit 72 are both supplied to respective channel selectors $73_1$, $73_2$ and $73_3$. These selectors $73_1$, $73_2$ and $73_3$ are respectively supplied with select signals $SE_1$, $SE_2$ and $SE_3$ (see FIGS. 3D, 3H and 3L) so that each of the selectors $73_1$, $73_2$ and $73_3$ produces the color subcarrier from the color subcarrier generating circuit 71 as it is during the 1st field and 3rd field periods, while each of them produces the color subcarrier with the phase inverted from the phase shifting circuit 72 during the 2nd field and 4th field periods. The signals from the selectors $73_1$, $73_2$ and $73_3$ are respectively supplied to the NTSC encoders $5_1$, $5_2$ and $5_3$ and also to burst signal generating circuits $74_1$, $74_2$ and $74_3$ which then generate burst signals $SB_1$, $SB_2$ and $SB_3$ of respective channels. These burst signals $SB_1$, $SB_2$ and $SB_3$ are respectively supplied to the encoders $5_1$, $5_2$ and $5_3$. The operation in each of the encoders $5_1$, $5_2$ and $5_3$ is known well and so the encoder $5_1$ of, for example, the 1st channel will be described. The 1st channel red and blue color difference signals $R-Y_1$ and $B-Y_1$ from the speed converting circuits 4R and 4B are respectively supplied to balanced modulators 51 and 52, while the color subcarrier signal from the selector $73_1$ is supplied through a 90° phase-shifting circuit 53 to the balanced modulator 51 and the color subcarrier signal from the selector $73_1$ is directly supplied to the balanced modulator 52 whereby the respective color subcarriers are balanced-modulated by the red and blue color difference signals in the balanced modulators 51 and 52. The modulated signals from the balanced modulators 51 and 52 are synthesized by a synthesizer or composer 54 and the synthesized output SC therefrom is supplied through an amplifier 55 to a synthesizing or composing circuit 56. The composer 56 is supplied with the luminance signal $SY_1$ derived from an amplifier 57, the burst signal $SB_1$ from the burst signal generating circuit $74_1$ and a synchronizing signal SS. As a result, the composer 56 produces the NTSC color video signal of the first channel which is then delivered to the output terminal $6_1$.

Similarly, the NTSC color video signals of the second and third channels are developed at the output terminals $6_2$ and $6_3$, respectively.

If the signals of 3 channels are recorded by the following special VTR so as to form a pattern of, for example, SMPTE type C format and then reproduced by an ordinary VTR capable of reproducing a tape recorded by such SMPTE type C format, a high speed moving object can be reproduced as a picture of a so-called slow motion mode.

Figure 6:
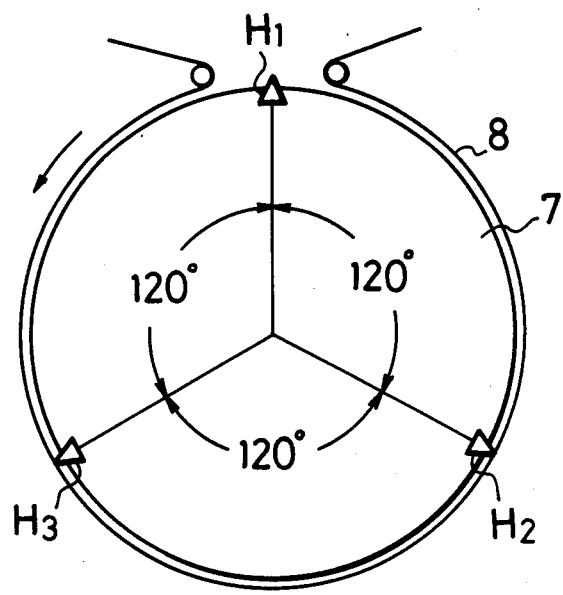
FIGS. 6 and 7 are respectively diagrams useful for explaining an example of a video tape recorder (VTR) which records a signal obtained from the video signal generating apparatus of the invention.

FIG. 6 shows an example of a rotary head assembly of such special VTR in which, rotary heads the number of which corresponds to the number of channels, namely, three rotary heads $H_1$, $H_2$ and $H_3$ are mounted to a tape guide drum 7 with an equal angular distance, namely, an angular distance of 120° therebetween. On the other hand, a tape 8 is wound around the tape guide drum 7 at its peripheral surface over a predetermined angle, for example, 344° to form an omega shape whereby the parallel video signals of 3 channels can sequentially be recorded by the three heads $H_1$, $H_2$ and $H_3$.

In this case, since the VTR having such rotary head assembly is designed to perform the recording complying with the SMPTE type C format, the revolution speed of the rotary heads is selected to have a ratio of one revolution per one field of the NTSC standard television signal which is the same as that of the VTR capable of recording the signal in the pattern of the ordinary SMPTE type C format, In this case, however, the tape transportation speed is selected to be three times the original tape transportation speed. And, since the tape transportation speed is selected to be three times the original tape transportation speed, the inclination angle of a track relative to the longitudinal direction of the tape becomes different from that of the SMPTE type C format. This different inclination angle can be made coincident with that of the SMPTE type C format by adjusting the angle (so-called still angle) at which the tape 8 is wrapped slantwise around the tape guide drum 7.

Figure 7:
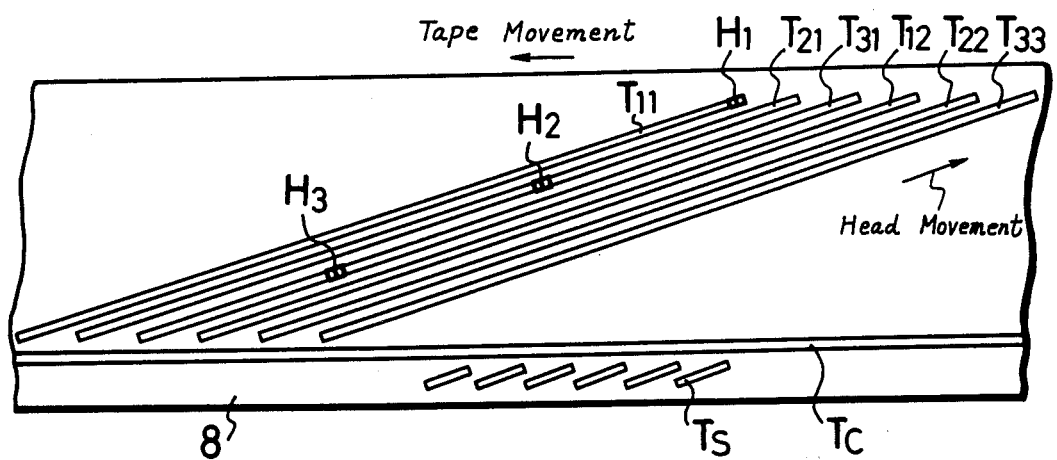

In FIG. 7, reference letter Tc designates a control signal track formed on the tape 8 and Ts a track on the tape 8 on which the synchronizing signal is recorded. Thus, as shown in FIG. 7, every three other tracks $T_{11}$, $T_{12}$, $T_{13}$... are formed by the head $H_1$, adjacent every three other tracks $T_{21}$, $T_{22}$, $T_{23}$... are formed by the head $H_2$ and remaining every three other tracks $T_{31}$, $T_{32}$, $T_{33}$... are formed by the head $H_3$, respectively. In this case, since the tape travelling speed is three times the normal tape travelling speed, during the period from the beginning of the tracing by the head $H_1$ to the beginning of the tracing by the head $H_2$, the tape is displaced by one track of the SMPTE type C format. In other words, the pitch of the recorded track becomes identical with that of the SMPTE type C format and becomes exactly coincident with that of the SMPTE type C format.

If the signals provided by frequency-modulating the signals of respective channels developed at the output terminals $6_1$, $6_2$ and $6_3$ are respectively recorded by such VTR, namely, the signal provided by frequency-modulating the video signal produced at, for example, the terminal $6_1$ is recorded by the head $H_1$, the signal provided by frequency-modulating the video signal produced at the terminal $6_2$ is recorded by the head $H_2$ and the signal provided by frequency-modulating the video signal produced at the terminal $6_3$ is recorded by the head $H_3$, respectively the video signal of each one field amount is sequentially recorded one by one as the tracks $T_{11}$, $T_{21}$, $T_{31}$, $T_{12}$, $T_{22}$, $T_{33}$..., In this case, when the signals produced at the output terminals $6_1$, $6_2$ and $6_3$ are recorded by the VTR, each signal is displaced by the angular distance between the heads, namely, the period of ⅓ the one field period FS.

As mentioned before, if the tape thus recorded is reproduced by the ordinary VTR (employing single rotary head) capable of reproducing the tape recorded by the SMPTE type C format, the picture image with speed three times the ordinary speed is reproduced with the speed decreased to ⅓ so that similarly to the slow motion mode relative to the so-called normal speed, the high speed moving object can be reproduced as a picture which can be perceived by the visual sense.

In this case, since the phase of the color subcarrier signal in the reproduced color video signal is the correct complying with each field, it is possible to obtain the beautiful color reproduced picture.

As mentioned before, it is needless to say that this invention is not limited to a case in which the scanning speed of the color video camera 1 is three times the ordinary scanning speed. Particularly when the scanning speed of the video camera 1 is selected to be five times the ordinary scanning speed to thereby produce signals of parallel 5 channels, although the arrangement order of the phases of the 1st to 4th fields in each channel are different, the 1st to 4th fields become correct in arrangement. As a result, in the case where the scanning speed of the color video camera 1 is five times the normal scanning speed and the number of channels is five, the five color subcarriers each phase of which is displaced by 360°/5 each are prepared for respective channels and then can directly be supplied to the respective channel encoders. In other words, it is sufficient that the color subcarriers of respective channels may have the continuous phase.

The present invention is not limited to the NTSC color television signal but can be applied to the signal of, for example PAL (phase alteration by line) system. In the case of the PAL system, the phase of the color subcarrier must be taken into consideration with 1st to 8th fields being taken as a unit.

As set forth above, according to the present invention, the high speed video signal picked up by the television camera with the scanning speed N times higher than the scanning speed of the standard television signal can be derived as the normal signal, namely, the signal with the same speed as that of the standard television signal. In addition, the above video signal can be produced in N channels in parallel at every fields, and even though the phase of color subcarrier is not continuous at each channel, phase becomes the phase of the color subcarrier bas on the inherent order of fields of the high speed signal. As a result, if the video signal is recorded by VTR having the rotary head assembly as, for example, in FIG. 6 to form the SMPTE type C format and then reproduced by the ordinary VTR of single-head type capable of reproducing the tape recorded on the basis of the SMPTE type C format, the color subcarrier has the correct and continuous phase so that the high speed moving object can be reproduced as the correct color picture in slow motion mode.

The above description is given on the preferred embodiments of invention, but it will be apparent that many modifications and variations could be effected by one skilled in the art without departing from the spirits or scope of the novel concepts of the invention, so that the scope of the invention should be determined by the appended claims only.

We claim as our invention:

1. A video signal generating apparatus having a color video camera which has a higher scanning speed than that of a standard color video camera for generating a conventional standard television signal having a conventional bandwidth, comprising:
   means for dividing a color video signal from said video camera into a plurality of channel video signals having respective time axes;
   means for expanding the time axis of each of said channel video signals to produce a plurality of time axis expanded channel video signals;
   means for converting said time axis expanded channel video signals into a plurality of composite video signals each having a bandwidth similar to said conventional bandwidth of said conventional standard television signal; and
   means for supplying a reference signal to said means for converting so that each of said composite video signals has a color framing sequence the same as that of said conventional standad television signal.

2. The video signal generating apparatus according to claim 1, in which said means for dividing includes analaog-to-digital converter means for converting said video signal from said video camera into a digital video signal and a plurality of memory circuits, and said means for expanding includes writing and reading address setting circuit means, said plurality of memory circuits being controlled by said writing and reading address setting circuit means to expand the time axis of said digital video signal to produce a plurality of time axis expanded digital video signals and a plurality of digital-to-analog converting means for converting said time axis expanded digital video signals provided from said plurality of memory circuits into a corresponding plurality of time axis expanded analog video signals.

3. The apparatus according to claim 1, in which said reference signal is a color subcarrier signal.

4. The apparatus according to claim 1, in which said means for supplying a reference signal includes reference signal generator means for producing first and second color subcarrier signals, said first and second color subcarrier signals having opposite phases, and means for selectively supplying one of said first and second color subcarrier signals to said converting means in response to the scanning speed of said video camera.

* * * * *